(12) United States Patent
Yamada et al.

(10) Patent No.: US 6,230,576 B1
(45) Date of Patent: May 15, 2001

(54) ELECTRICALLY-DRIVEN POSITION CHANGING APPARATUS

(75) Inventors: Yoshichika Yamada, Kuwana-gun; Masashi Hori, Nukata-gun; Hironori Asa, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/406,136

(22) Filed: Sep. 27, 1999

(30) Foreign Application Priority Data

Sep. 28, 1998 (JP) .................................................. 10-273346
Jul. 30, 1999 (JP) .................................................. 11-217083

(51) Int. Cl.[7] ........................... F16H 59/00; F16H 61/00; F16H 63/00
(52) U.S. Cl. ........................................... 74/335; 74/473.12
(58) Field of Search ................................. 74/473.12, 335

(56) References Cited

U.S. PATENT DOCUMENTS 5,094,115  3/1992  Michihira et al. .

FOREIGN PATENT DOCUMENTS

3-234965  10/1991  (JP) .
5-44511   2/1993   (JP) .
6-40513   5/1994   (JP) .
7-26060   3/1995   (JP) .

*Primary Examiner*—Dirk Wright
(74) *Attorney, Agent, or Firm*—Pillsbury Madison & Sutro LLP

(57) ABSTRACT

A single actuator such as an electric motor is used to actuate a shift range changing mechanism of an automatic transmission. The motor has a plurality of torque generating units each of which is capable of generating a torque sufficient to effect any shift range changes of the shift range changing mechanism. All of the torque generating units are driven electrically normally in response to a shift range change command. Operation of each torque generating unit is monitored separately from each other. When one of the torque generating units fails in operation, the torque generating unit in failure is not driven but the other torque generating units are driven to effect a shift range change. The failure of the torque generating units is indicated on an indicator in a vehicle. The motor may be a brushless type or a reluctance type.

10 Claims, 9 Drawing Sheets

ELECTRICALLY-DRIVEN POSITION CHANGING APPARATUS

CROSS REFERENCE TO RELATED APPLICATION

This application relates to and incorporates herein by reference Japanese Patent Applications No. 10-273346 filed on Sep. 28, 1998 and No. 11-217083, filed on Jul. 30, 1999.

BACKGROUND OF THE INVENTION

1. Field of the Invention

The present invention relates to a position changing apparatus, such as a shift range changing apparatus for vehicle automatic transmissions which changes the shift ranges by actuators such as electric motors.

2. Related Art

It is known (e.g., JP-A-5-44511) to use a direct current electric motor as a drive source for changing gear shift ranges in a vehicle automatic transmission in response to a vehicle driver's operation of a gear shift lever. If the electric motor or a drive circuit fails, however, changing the shift ranges is disabled.

U.S. Pat. No. 5,094,115 (JP-A-3-255252) proposes to use two pairs of a direct current motor and a drive circuit. One pair is used normally, and the other pair is used upon failure of the one pair so that the shift range changing operation may be enabled by either one of the pairs. However, the two pairs will result in the increase in the number of component parts and in the apparatus cost.

SUMMARY OF THE INVENTION

It is therefore an object of the present invention to provide an electrically-driven position changing apparatus which can be used as a shift range changing apparatus for vehicle automatic transmissions which enables a shift range changing operation continuously even upon occurrence of failure with less increase in the number of component parts and the apparatus cost.

According to the present invention, a single actuator such as an electric motor is used to actuate a position changing apparatus such as a shift range changing mechanism for a vehicle automatic transmission. The motor has a plurality of torque generating units each of which is capable of generating a torque sufficient to effect any position changes of the shift range changing mechanism. All of the torque generating units are driven electrically normally in response to a shift range change command. Operation of each torque generating unit is monitored separately from each other. When one of the torque generating units fails in operation, the torque generating unit in failure is not driven but the other torque generating units are driven to effect a shift range change. The failure of the torque generating units is indicated. The motor may be a brushless type or a reluctance type.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to various embodiments which are directed to a shift range changing apparatus for vehicle automatic transmissions.

First Embodiment

Figure 1:
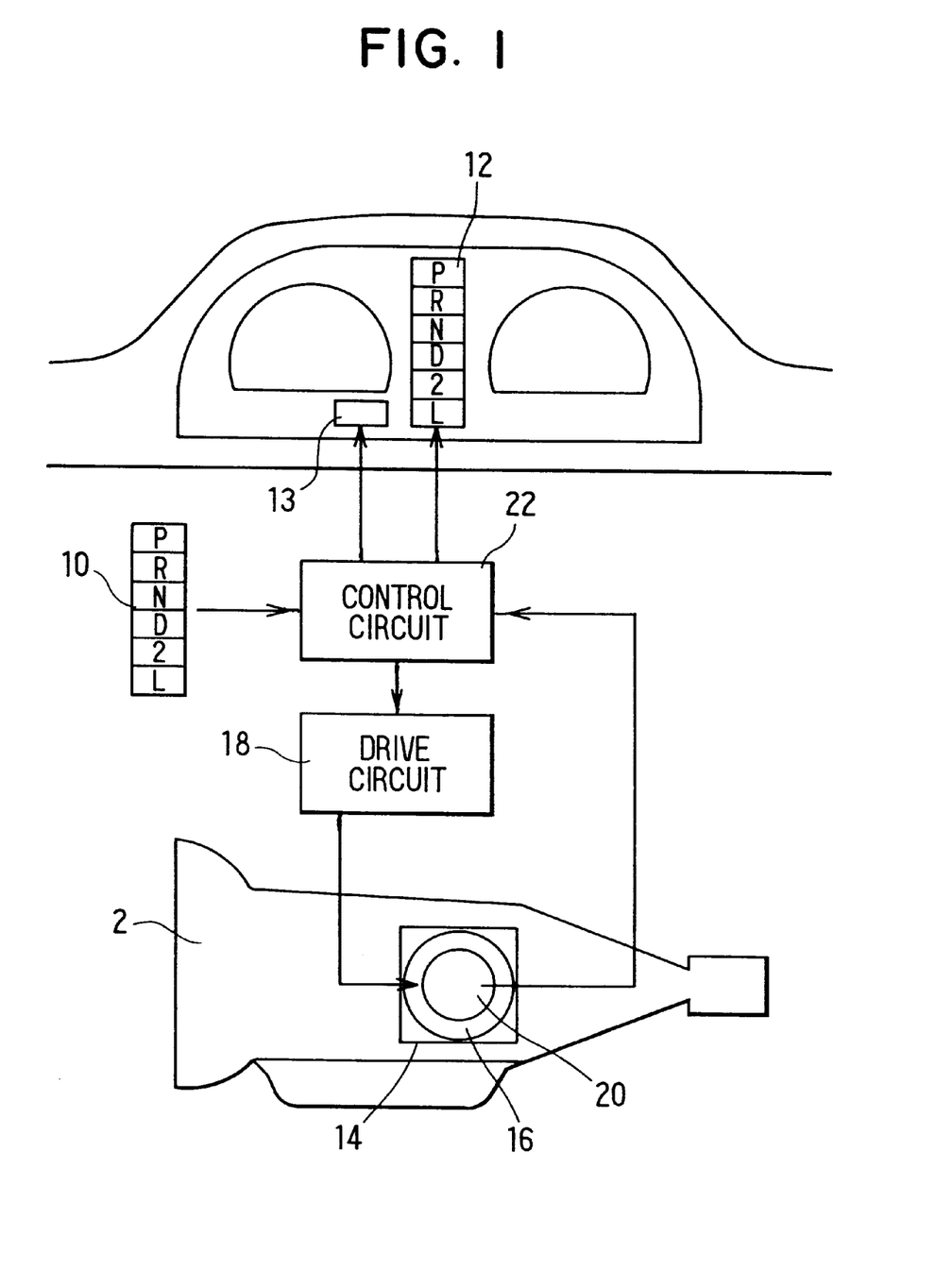
FIG. 1 is a schematic diagram showing a shift range changing apparatus according to a first embodiment of the present invention.

Referring first to FIG. 1, a shift range changing apparatus comprises an selector unit 10 having a shift lever (not shown) through which a vehicle driver selects and instructs shift ranges of an automatic transmission 2, a display unit 12 for displaying a selected shift range on a vehicle instrument panel, and an indicator light 13 for indicating a failure of an actuator on the instrument panel. The apparatus further comprises a shift range changing mechanism 14 constructed mechanically and mounted on the automatic transmission 2 for changing the shift ranges, and an electric motor 16 (actuator) mounted on the automatic transmission 2 for driving the shift range changing mechanism 14. The apparatus further comprises a drive circuit 18 for the motor 16, and a control circuit 22 for controlling the motor 16 through the drive circuit 18. The control circuit 22 is connected to the selector unit 10 and a rotation sensor 20 for detecting a rotation speed of the motor 16. Thus the control circuit 22 electrically changes shift ranges of the automatic transmission 2 to the shift range selected in the selector unit 10 and also changes gear ratios of the automatic transmission 2 within the selected shift range.

The control circuit 22 is a microcomputer which includes a CPU, ROM, RAM, etc., and is programmed to execute a shift range change control for the motor 16, shift range display control for the display unit 12, and a failure determination and indication control for the indicator light 13.

Figure 2:
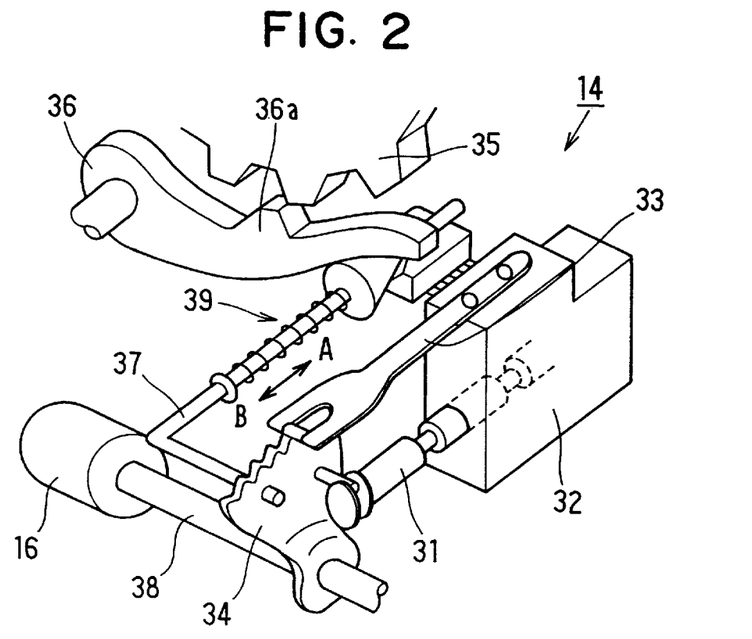
FIG. 2 is a perspective view showing a shift range changing mechanism used in the first embodiment.

The shift range changing mechanism 14 is for changing the shift range of the automatic transmission 2 to either one of the parking range (P), reverse range (R), neutral range (N), drive range (D), second range (2) and low range (L), and is constructed as shown in FIG. 2.

The shift range changing mechanism 14, which is conventional, comprises a range changing valve 31 and a manual valve 32 which control the engagement and disengagement of friction engagement members (not shown) in the automatic transmission 2 in response to the selected shift range. The shift range changing mechanism 14 further comprises a detent spring 33 and a detent lever 34 for maintaining the shift range of the automatic transmission 2. The shift range changing mechanism further comprises a park rod 37 which fits a park pawl 36 with a park gear 35 provided on the output shaft (not shown) of the automatic transmission 2 to restrict the output shaft of the automatic transmission 2, when the shift range is changed to the parking range (P). A control rod 38 is fixedly coupled with the detent lever 34.

The control rod 38 is directly connected to the output shaft of the motor 16, so that the shift range changing mechanism may be driven electrically. Specifically, when the control rod 38 is rotated by the motor 16, the detent lever 34 rotates around the control rod 38 to move the range changing valve 31 (manual valve 32) and the park rod 37 to positions corresponding to the selected shift ranges.

When the shift range of the automatic transmission 2 is to be changed to the parking range (P), the park rod 37 is moved in the A direction in FIG. 2 to mesh a protrusion 36a of the park pawl 36 with the teeth of the park gear 35. When the shift range of the automatic transmission 2 is to be changed from the parking range (P) to the other ranges, on the other hand, the park rod 37 is moved in the B direction in FIG. 2 against the friction force between the park gear 35 and the protrusion 36a meshing each other.

A biasing member 39 including a biasing spring is provided on the park rod 37 to bias the park pawl 36 toward the park gear 35 so that the park pawl 36 is rotated to a position to enable the meshing of the protrusion 36a with the teeth of the park gear 35. Thus, when the shift range is changed to the parking range (P), the reaction force of the biasing member 39 exerts on the control rod 38 through the park rod 37 and the detent lever 34 until the protrusion 36a meshes the park gear 35.

Once the shift range of the automatic transmission 2 has been changed to the parking range (P), the park gear 35 tends to rotate due to the weight of the vehicle, particularly when the vehicle is on a slope. As a result, the teeth of the park gear 35 bites the protrusion 36a and pushes the park pawl 36 in the downward direction in FIG. 2. When the shift range is to be changed from the parking range (P), the friction between the park pawl 36 and the park rod 37 increases due to the force exerted from the park pawl 36 to the park rod 37. Thus, the force required to rotate the control rod 38 to the position corresponding to the parking range (P) to another position corresponding to a range other than the parking range (P) is required to be large enough.

Thus, the force required to change the shift range to the parking range (P) from other ranges and the force required to change the shift range from the parking range (P) to the other ranges will become more than twice as large as the forces required to change the shift range among the other ranges.

Figure 3A:
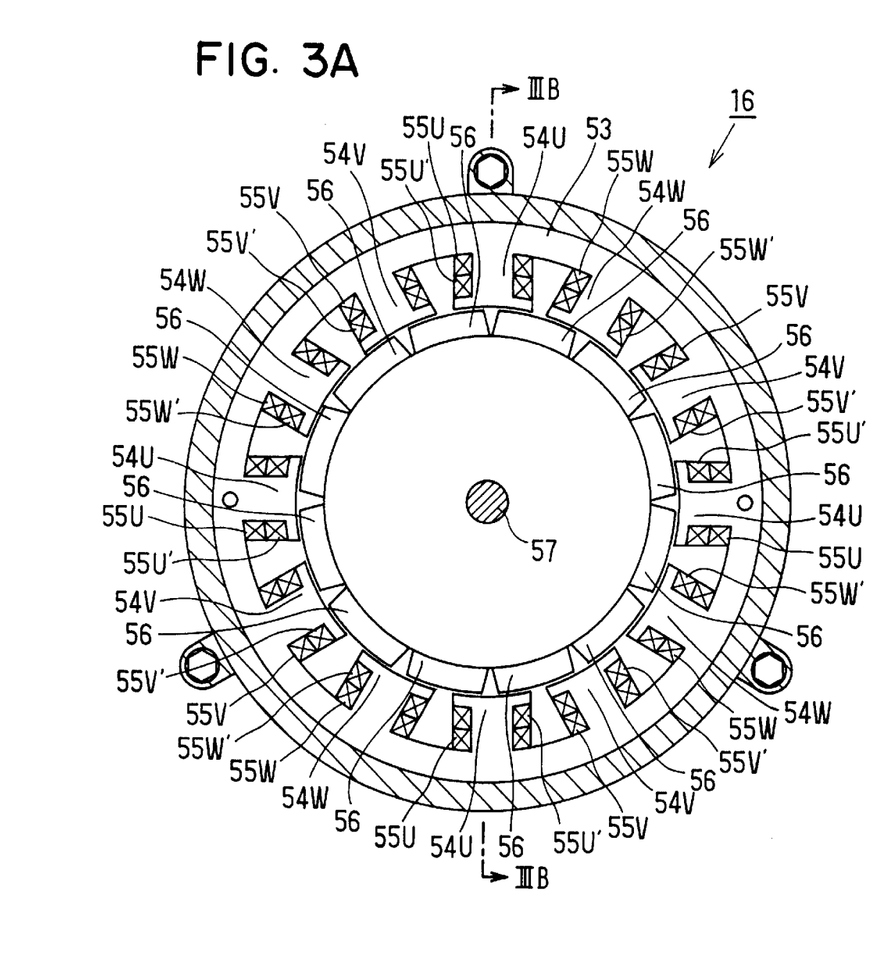
FIGS. 3A and 3B are sectional views showing an actuator used in the first embodiment.
Figure 3B:
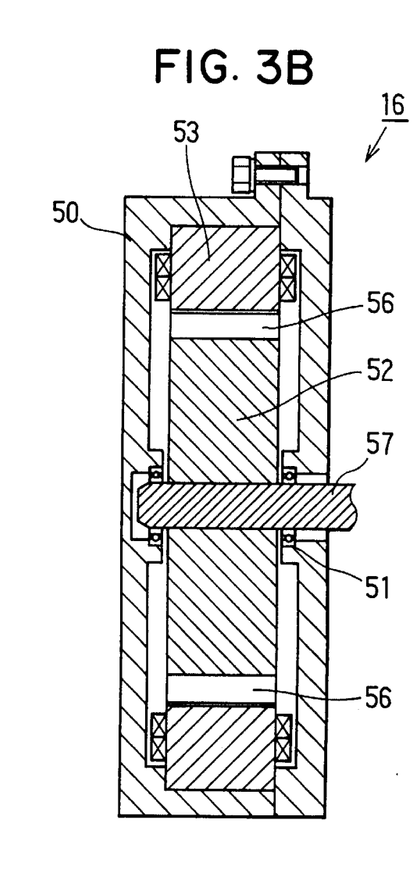

The motor 16 is constructed as shown in FIGS. 3A and 3B. The motor 16 comprises a rotor 52 supported rotatably in a housing 50 through bearings 51, and a stator 53 disposed in the housing coaxially with the axis of rotation of the rotor 52. The stator 53 has twelve teeth (magnetic poles) 54 arranged at every 30 degrees in the circumferential direction and protruding toward the rotor 52 in the radial direction. The teeth 54 are divided into teeth 54U, 54V and 54W in correspondence with three phases U, V and W in the circumferential direction. Three pairs of stator windings 55U and 55U', 55V and 55V' and 55W and 55W' are wound around the teeth 54U, 54V and 54W, respectively. The winding pairs are connected electrically in parallel.

Twelve permanent magnets 56 are arranged on the outer circumference of the rotor 52 at every 30 degrees in the circumferential direction. The rotor 52 has a rotation shaft 57 at its radial center as the output shaft of the motor 16. The rotation shaft 57 protrudes from the housing 50 to be directly coupled with the control rod 38 of the shift range changing mechanism 14. The rotation sensor 20 may be mounted on the rotation shaft 57. Thus, the motor 16 is a brushless direct current motor which is capable of rotating in both forward and reverse directions and of stopping at a predetermined rotational position depending on the sequence of supplying the electric current or energization of the stator windings 55 of U, V and W-phases.

Figure 4:
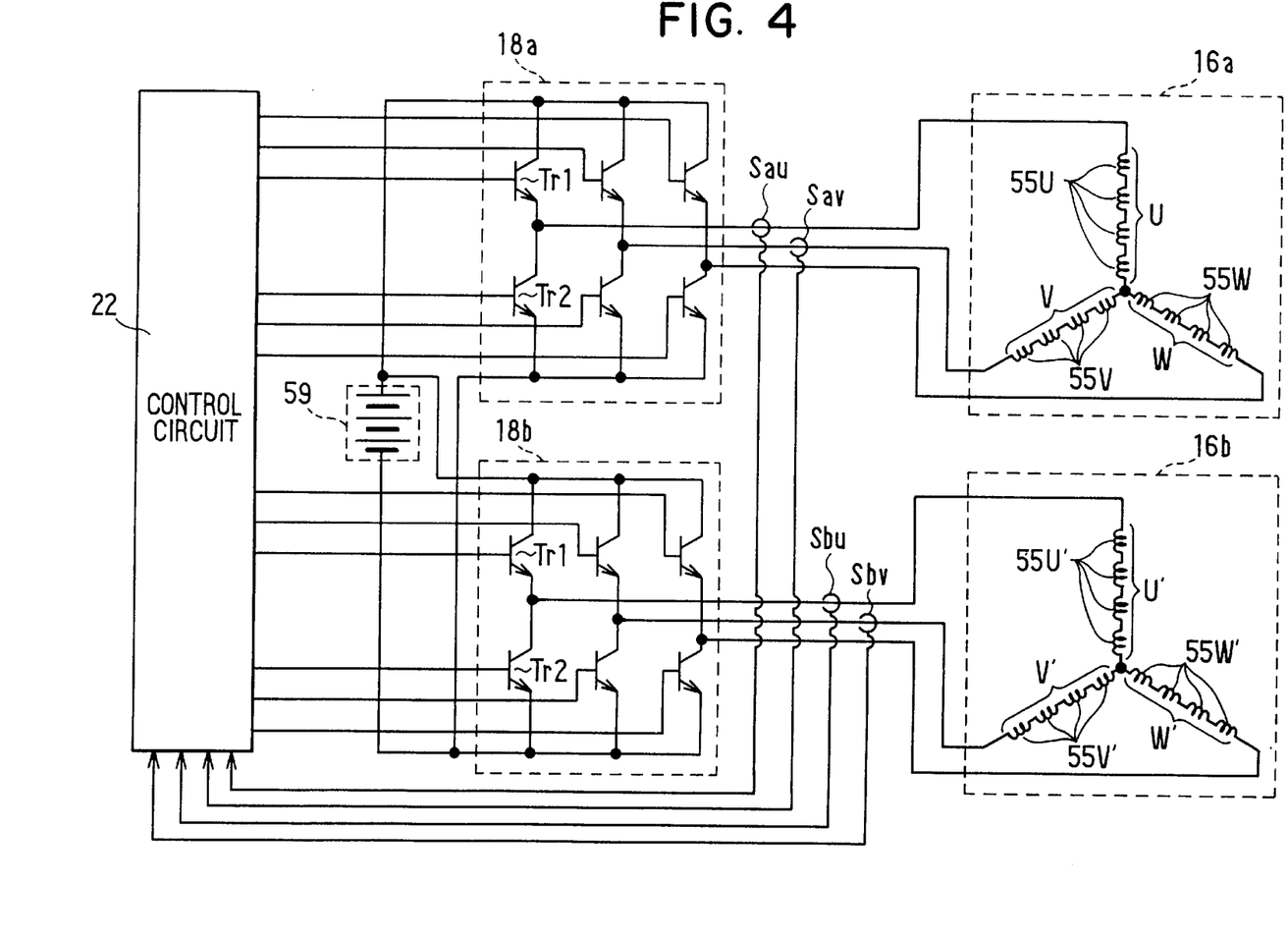
FIG. 4 is an electrical wiring diagram showing a drive circuit used in the first embodiment.

As shown in FIG. 4, the first set of stator windings 55U, 55V and 55W are arranged in the star or Y connection, while the second set of stator windings 55U, 55V' and 55W' are arranged in the star or Y connection. In each set, the windings of each phase are connected in series. Thus, two winding units 16a and 16b are provided to function as two torque generators.

The drive circuit 18 comprises two drive circuits 18a and 18b connected to a storage battery 59. The drive circuits 18a and 18b control the phase currents in the winding units 16a and 16b, respectively. Each of the drive circuits 18a and 18b has three pairs of switching transistors Tr1 and Tr2 for three phases U, V and W. The transistors Tr1 and Tr2 in each pair are connected in series, and the junction of the transistors Tr1 and Tr2 are connected to the corresponding windings.

Current detectors Sau and Sav are operatively coupled with the electrical wires for the phases U and V in the winding unit 16a, and current detectors Sbu and Sbv are operatively coupled with the electrical wires for the phases U' and V' in the winding unit 16b. Each current detector detects the electric current (phase current) actually supplied to the associated windings, and supplies a detection signal indicative of the detected current to the control circuit 22.

Because the windings are arranged in the star connection in each winding unit 16a and 16b, the sum of the currents supplied to the windings in each winding unit becomes zero. Therefore, the current supplied to one winding can be determined from the currents supplied to the other two windings. Therefore, no current detectors are coupled with the electric wires for the phases W and W'.

The control circuit 22, receiving the command signal from the selector unit 10 indicative of the selected shift range and the detection signals from the current detectors Sau, Sbu, Sav and Sbv, monitors the detected currents supplied to the phases U, U' V and V', and calculates the currents supplied to the phases W and W' to PWM-control the transistors Tr1 and Tr2 of each phase. Specifically, the control circuit 22 feedback-controls the currents supplied to the windings of the phases U, U', V, V', W and W' in response to the detection signals, so that the rotational position of the rotor 52 and hence the rotational position of the control rod 38 is regulated to the predetermined position corresponding to the selected shift range. That is, when the shift command signal is applied from the selector unit 10, the control circuit 22 sets the phase current control pattern based on the control characteristics shown in FIG. 5 to change the rotational position of the rotor 52 from the present position to the new position which corresponds to the newly selected shift range.

Figure 5:
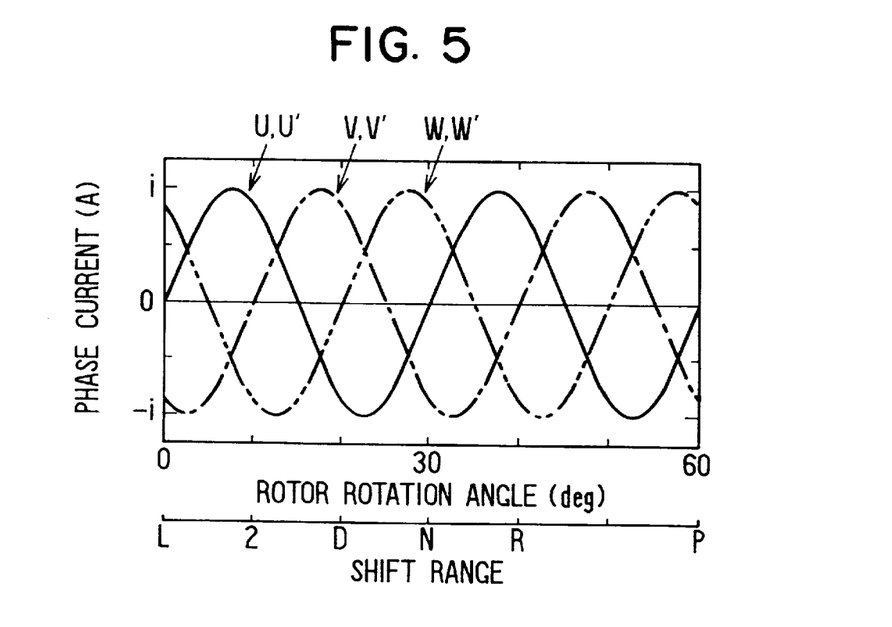
FIG. 5 is a diagram showing a control characteristics relation between a rotor rotation angle and a phase current pattern in the first embodiment.

The control circuit 22 executes the above winding energization control in its main routine (not shown) while normally energizing both winding units 16a and 16b. The current control characteristics shown in FIG. 5 is set so that the motor 16 generates a rotational torque which is sufficient to change the shift range of the automatic transmission to and from the parking range (P) even when only one of the winding units 16a and 16b is energized. Thus, the shift range changing operation is enabled even when one of the winding units 16a and 16b or its associated drive circuit 18a or 18b fails to operate.

The phase currents supplied to the winding units 16a and 16b become abnormal if the winding units 16a and 16b or the driver circuits 18a and 18b fail to operate normally, for instance, if the windings are short-circuited or disconnected. Therefore, the control circuit 22 checks for failures of the motor drive system in response to the detection signals from the current detectors Sau, Sbu, Sav and Sbv. When the control circuit 22 determines the failure in one set of the winding unit and the drive circuit fails, the control circuit 22 switches the motor drive system from the one set in failure the other set of the winding unit and the driver circuit and also activates the indicator light 13 to indicate the occurrence of failure. For this operation, the control circuit 22 executes the routine shown in FIG. 6 at every predetermined interval of time during the period from the issuance of the range shift command to the completion of changing the shift range.

Figure 6:
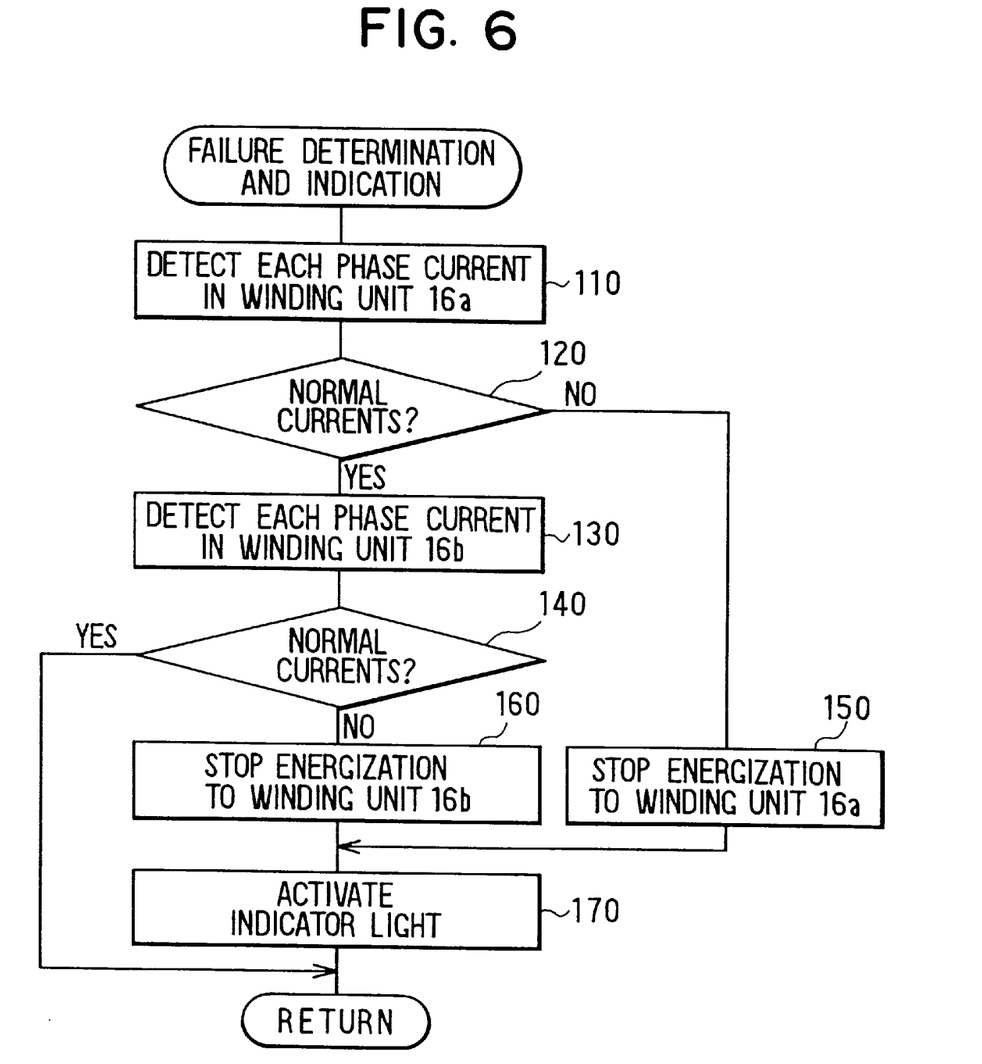
FIG. 6 is a flow diagram showing a failure determination and indication routine executed by a control circuit used in the first embodiment.

Specifically, the control circuit 22 detects or reads at step 110 the detection signals of the current detector Sau and Sav to determine the phase currents of the phases U and V flowing in the windings 55U and 55V of the winding unit 16a and calculates the phase current of the phase W flowing in the windings 55W of the winding unit 16a from the detected currents of the phases U and V.

The control circuit 22 checks at step 120 whether all the phase currents of the phases U, V and W flowing to the winding unit 16a are normal. If at least one of the windings of the winding unit 16a is grounded, the corresponding one of the phase currents will become excessively large. If at least one of the windings of the winding unit 16a is disconnected or the driving system for the winding unit 16a including the drive circuit 18a has a disconnection or short-circuiting, the corresponding one of the phase currents will become excessively small (zero) continuously. Thus, failure of the winding unit 16a or the drive circuit 18a is determined, when at least one of the detected current is larger than a predetermined reference level or the zero-current condition continues for a predetermined reference period of time.

If the determination at step 120 is YES (no failure in winding unit 16a) at step 120, the control circuit 22 detects or reads at step 130 the detection signals of the current detector Sbu and Sbv to determine the phase currents of the phases U' and V' flowing in the windings 55U' and 55V' of the winding unit 16b and calculates the phase current flowing in the windings 55W' of the winding unit 16b from the detected phase currents of the phases U' and V'.

The control circuit 22 further checks at step 140 whether all the phase currents of the phases U', V'and W' flowing to the winding unit 16b are normal in the same manner as at step 120. If the determination at step 140 is YES (no failure in winding unit 16b), the control circuit 22 ends this routine to return to the main routine (not shown) which is for controlling energization of windings.

If the determination at step 120 is NO (failure in winding unit 16a), the control circuit 22 instructs to stop an energization control for the winding unit 16a and maintain an energization control for the winding unit 16b. Thus, the control circuit 22 prevents the drive circuit 18a and the windings 55U, 55V and 55W of the winding unit 16a from burning out which would otherwise occur due to the excessively large currents.

If the determination at step 140 is NO (failure in the winding unit 16b), the control circuit 22 instructs to stop an energization control for the winding unit 16b and maintain an energization control for the winding unit 16a. Thus, the control circuit 22 prevents the drive circuit 18b and the windings 55U', 55V' and 55W' of the winding unit 16b from burning out which would otherwise occur due to the excessively large currents.

The control circuit 22 then activates at step 170 the indicator light 13 provided in front of a vehicle driver's seat to indicate the failure in the motor drive system of the shift range changing apparatus. The above failure determination and indication routine returns to the main routine (not shown) after step 170.

According to the first embodiment, the motor 16 has a plurality of winding units, e.g., two units 16a and 16b. Therefore, even when one winding unit fails, the shift range can be changed to the selected range by using another winding unit in the same motor 16. Further, a plurality of drive circuits is provided in correspondence with the winding units to independently drive the winding units. Therefore, even when a failure occurs in one set of the drive circuit and the winding unit, the shift range can be changed to the selected range other than by using another set of the drive circuit and the winding unit.

According to the first embodiment, the rotation shaft 57 of the motor 16 is directly coupled to the control rod 38 without using any gears inbetween the two. The direct coupling is free from foreign obstacles which would disable a torque transmission via gears when jammed in the gears. Therefore, the reliability of operation of the changing mechanism 14 is enhanced.

According to the first embodiment, the phase currents supplied to the winding units 16a and 16b are set to be large enough to generate a drive torque for changing the shift ranges between any two ranges under the condition that only one winding unit is energized. Therefore, even when one winding unit fails, the shift range change can be effected by energizing another winding unit.

According to the first embodiment, all the winding units 16a and 16b are energized normally for effecting the shift range changing and the failure of each winding unit is checked for separately. Therefore, when either one fails, it can be indicated to while enabling the shift range changing by using another winding unit.

Second Embodiment

Figure 7A:
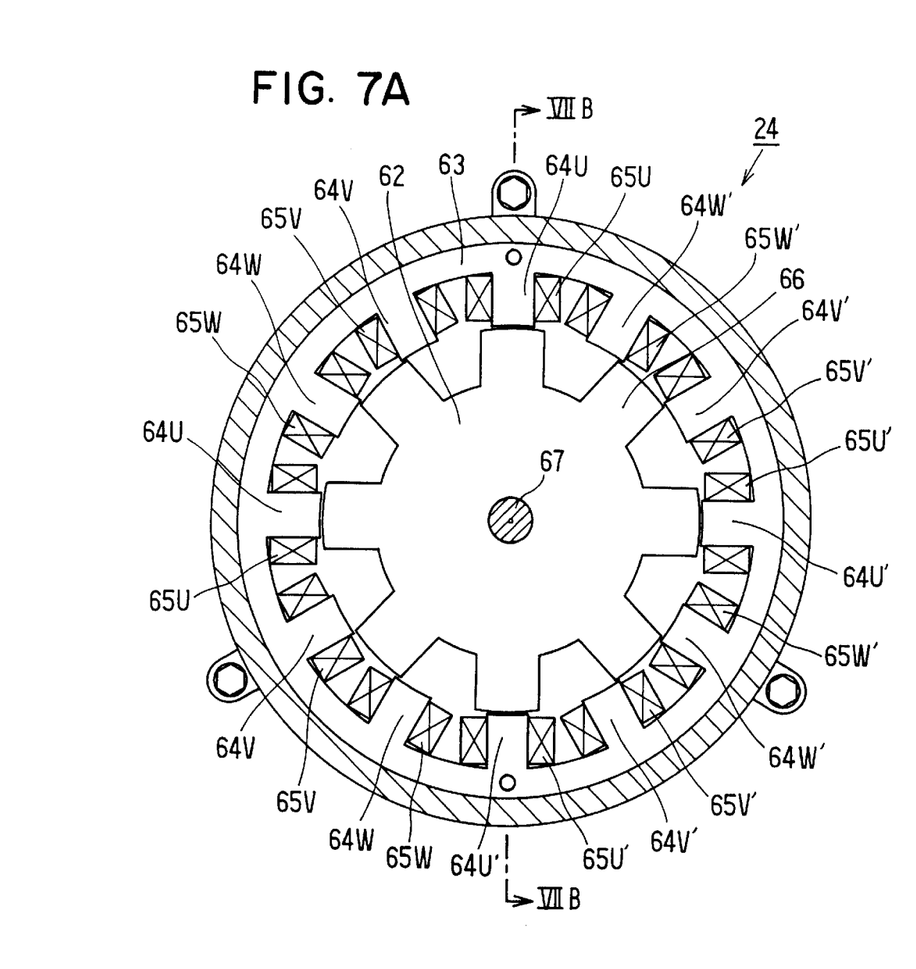
FIGS. 7A and 7B are sectional views showing an actuator used in a second embodiment of the present invention.
Figure 7B:
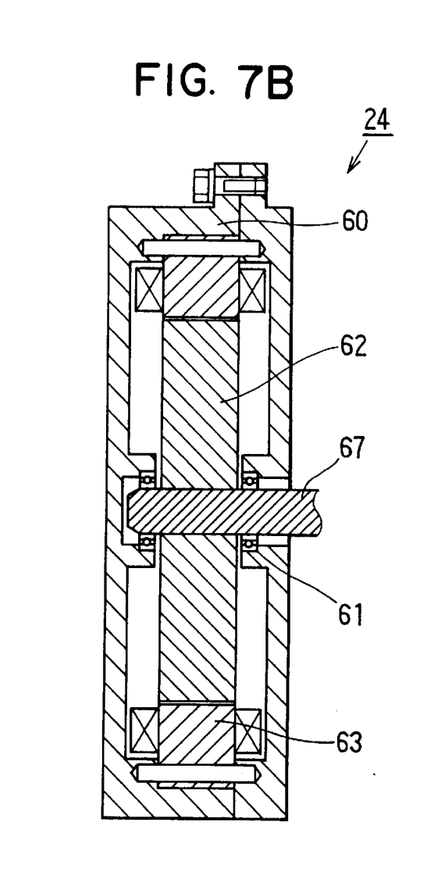

In the second embodiment, as shown in FIGS. 7A and 7B, a switched reluctance type motor (SR motor) 24 having no permanent magnets is used as the actuator for the shift range changing mechanism 14 in place of the motor 16. The drive circuits 18a and 18b are constructed as shown in FIG. 8.

The motor 24 comprises a single rotor 62 supported rotatably in a housing 60 through bearings 61, and a single stator 63 disposed in the housing 60 coaxially with the axis of rotation of the rotor 62. The stator 63 has twelve teeth (magnetic poles) 64 arranged at every 30 degrees in the circumferential direction and protruding toward the rotor 62 in the radial direction. The teeth 64 are divided into three phases in the circumferential direction. Further, the teeth 64 of each phase are divided into right side and left side with respect to a rotation shaft 67. Thus, the teeth 64 are divided into six phases U, V, W, U', V' and W' in the end. Windings 65U, 65V, 65W, 65U', 65V', and 65W' are wound singly around teeth 64U, 64V, 64W, 64U', 64V' and 64W', respectively. The rotor 62 has eight protrusions 66 arranged in the circumferential direction at every 45 degrees and protruding toward the teeth in the radial direction. Thus, the rotor 62 can be rotated in the forward and reverse directions and can be stopped at any desired rotational position by controlling the phase currents.

Figure 8:
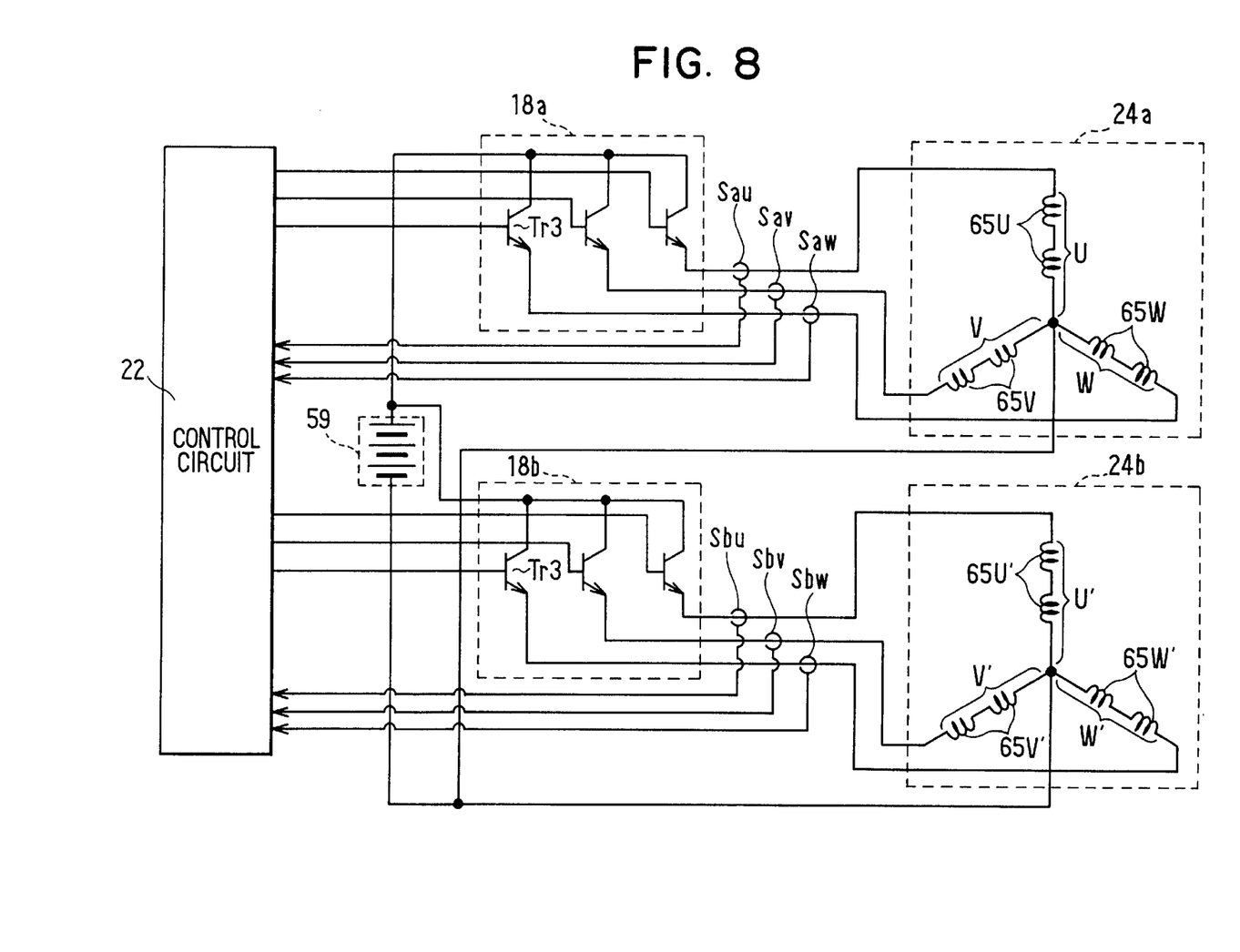
FIG. 8 is an electrical wiring diagram showing a drive circuit used in the second embodiment.

As shown in FIG. 8, the drive circuit 18 comprises two drive circuits 18a and 18b for controlling the phase currents in the winding units 24a (left side windings 65U, 65V and 65W) and 16b (right side windings 65U', 65V', and 65W'), respectively. The windings in each phase are connected in series, and the windings are arranged in the star or Y-connection in each of the winding units 24a and 24b. The neutral points of the star or Y-connected windings in each winding unit 24a and 24b are grounded. Each of the drive circuits 18a and 18b has only one transistor Tr3 for each phase, because the direction of current supplied to each phase need not be reversed due to the reluctance type of the motor 24.

Figure 9A:
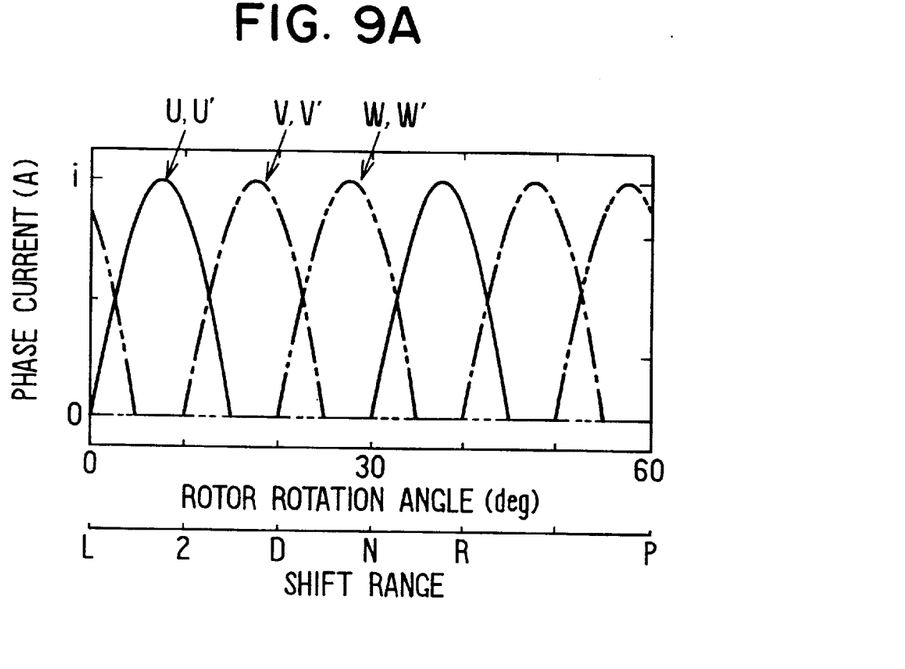
FIGS. 9A and 9B are diagrams showing control characteristics relations between a rotor rotation angle and a phase current pattern in the second embodiment.
Figure 9B:
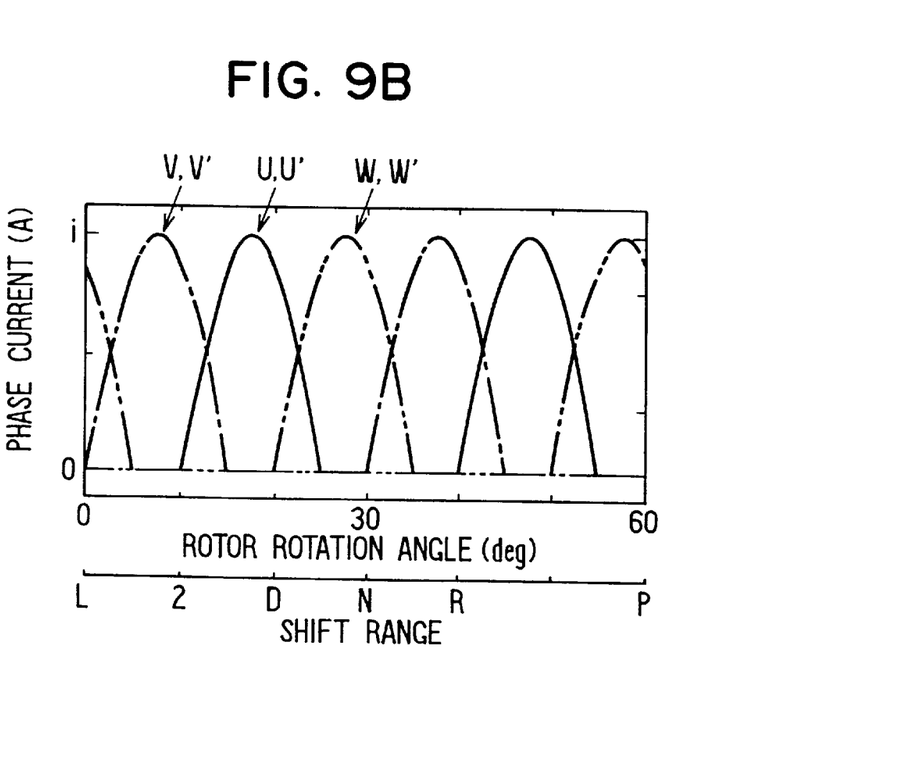

Thus, the control circuit 22 is constructed to change the current supply pattern as shown in FIGS. 9A ad 9B between the cases in which the rotor 66 is rotated in the forward direction for changing the shift range from the low range (L) to the parking range (P) in the automatic transmission 2 and the rotor 66 is rotated in the reverse direction for changing the shift range from the parking range (P) to the low range (L) in the automatic transmission 2.

Current detectors Sau, Sav, Saw, Sbu, Sbv and Sbw are provided in all of the electric wires connecting the drive circuits 18a and 18b and the winding units 24a and 24b, because the currents are supplied to the phases from each other. Thus, each phase current is detected and feedback-controlled by the control circuit 22 in the similar manner as in the first embodiment.

According to the second embodiment, two sets of the winding unit and the drive circuit are provided. Therefore, the similar advantages are provided as in the first embodiment.

Third Embodiment

Figure 10A:
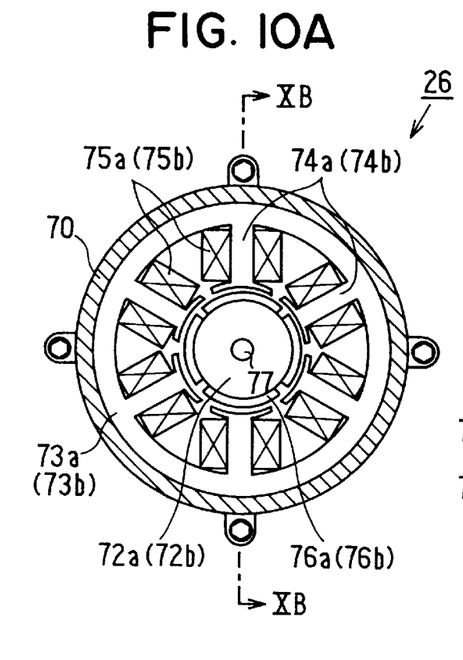
FIGS. 10A and 10B are sectional views showing an actuator used in a third embodiment of the present invention.
Figure 10B:
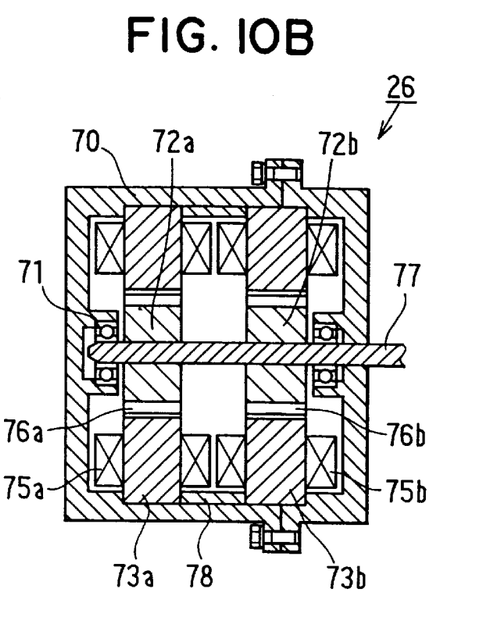

In the third embodiment, as shown in FIGS. 10A and 10B, a motor 26 having two motor sets is used. Specifically, a set of a rotor 72a and a stator 73a and a set of a rotor 72b and a stator 73b are coupled via a single rotation shaft 77 and are arranged in the axial direction within a housing 70. Four permanent magnets 76a and 76b are arranged on the outer circumference of the rotors 72a and 72b in the circumferential direction, respectively. The stators 73a and 73b are spaced apart by a spacer 78. The stators 73a and 73b has six teeth 74a and 74b, respectively. Six windings 75a and 75b are wound around the teeth 74a and 74b, respectively, so that the windings provides three phases in each motor set. The rotation shaft 77 is supported by bearings 71 and protrudes in the axial direction from the housing to be directly coupled to the control rod 38.

The third embodiment also has two motor sets as two torque generators. Therefore, the third embodiment provides the similar advantages as in the first embodiment.

Fourth Embodiment

Figure 11A:
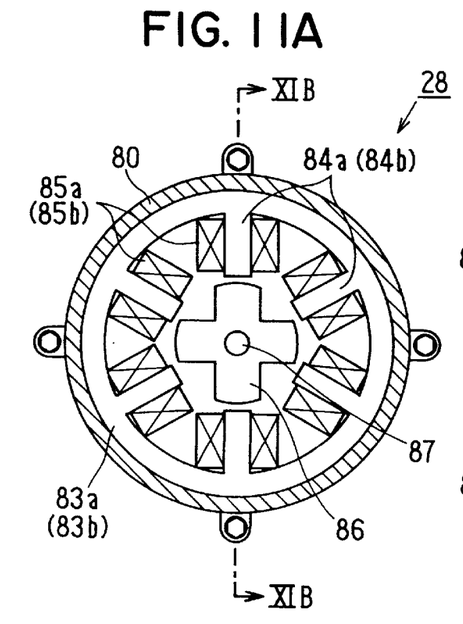
FIGS. 11A and 11B are sectional views showing an actuator used in a fourth embodiment of the present invention.
Figure 11B:
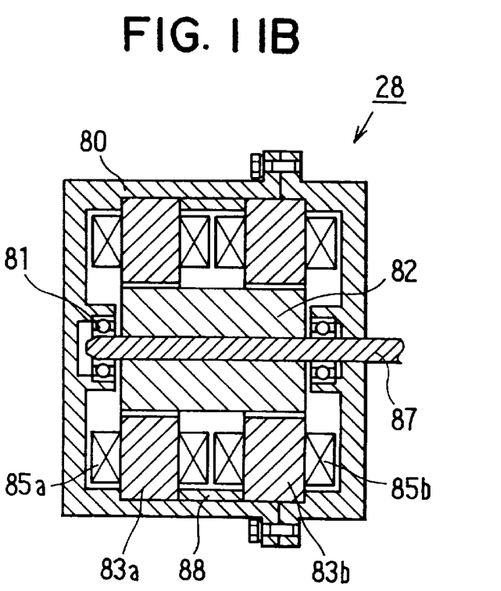

In the fourth embodiment, a motor 28 is constructed as shown in FIGS. 11A and 11B. Specifically, a single rotor 82 mounted on a rotation shaft 87 is supported rotatably in a housing 80 by bearings 81, and a pair of stators 83a and 83b are fixedly disposed coaxially with the rotor 82 within the housing 80. The stators 83a and 83b are spaced apart in the axial direction by a spacer 88. The stators 83a and 83b have six teeth 84a and 84b, respectively. Six windings 85a and 85b are wound around the teeth 84a and 84b, respectively, so that the windings provide three phases in each motor set.

The fourth embodiment also has two motor sets as two torque generators. Therefore, the third embodiment provides the similar advantages as in the first embodiment.

The brushless direct current type motor or the switched reluctance type motor are used as a synchronous motor in the above embodiments. However, the motor may be an induction type or the motor may be replaced with an electromagnetic solenoid, as long as the actuator has at least two torque generating units.

The present invention having been described above should not be limited to the disclosed embodiments and its modifications, but may also be applied to various position changing apparatus other than the shift range changing apparatus for the vehicle automatic transmissions.

What is claimed is:

1. A shift range changing apparatus for a vehicle automatic transmission comprising:
    a shift range changing mechanism for changing shift ranges;
    a single actuator for actuating the shift range changing mechanism;
    a drive circuit for driving the single actuator; and
    a control circuit for controlling the single actuator through the drive circuit in response to a shift change command applied externally to effect a shift range change operation of the shift range changing mechanism,
    wherein the single actuator includes a plurality of torque generating units which are operable independently from each other to be capable of actuating the shift range changing mechanism upon occurrence of failure in one of the torque generating units.

2. A shift range changing apparatus of claim 1, wherein:
    the control circuit is constructed to detect a failure of each of the torque generating units, and to indicate the detected failure via an indicator.

3. A shift range changing apparatus of claim 2, wherein:
    the control circuit is constructed to drive all of the torque generating units which are free of failure in response to the shift range change command; and
    the single actuator is constructed to actuate the shift range changing mechanism with a sum of torque generated by the torque generating units which are free of failure.

4. A shift range changing apparatus of claim 1, wherein:
    each of the torque generating units is constructed to generate a torque which is sufficient to actuate the shift range changing mechanism for effecting the shift range change independently.

5. A shift range changing apparatus of claim 1, wherein:
    the drive circuit includes a plurality of drive means which drive the torque generating units independently from each other, respectively.

6. A shift range changing apparatus of claim 1, wherein:
    the single actuator is an electric motor which has a single rotor, a plurality of stators arranged to face the rotor and spaced apart in an axial direction of the rotor, and a plurality of windings wound around each of the stators, so that each of the stators and the windings operates to rotate the single rotor independently as the torque generating units.

7. A shift range changing apparatus of claim 1, wherein:

the single actuator is an electric motor which has a rotor, a stator arranged to face the rotor and having a plurality of magnetic poles divided into a plurality of groups in a circumferential direction, and a plurality of windings wound around the magnetic poles respectively, so that each of the magnetic poles and the windings operates to rotate the rotor independently as the torque generating units.

8. A shift range changing apparatus of claim 1, wherein:

the single actuator is an electric motor which has a rotor, a stator arranged to face the rotor and having a plurality of magnetic poles, and a plurality of windings wound around each of the magnetic poles and connected in parallel, so that each of the magnetic poles and the windings thereon operates to rotate the rotor independently as one of the torque generating units.

9. A shift range changing apparatus of claim 1, wherein:

the single actuator is an electric motor having a rotation shaft; and the shift range changing mechanism has a drive shaft which is directly coupled with the rotation shaft.

10. A shift range changing apparatus of claim 1, wherein:

each of the torque generating units is constructed to generate a torque which is sufficient to actuate the shift range changing mechanism for effecting the shift range change to and from a parking range independently.

* * * * *